United States Patent Office 3,752,780
Patented Aug. 14, 1973

3,752,780
HALOGENATED METHYLOL PHENOLS
Kenneth C. Petersen and Charles A. Blowers, Scotia, N.Y., assignors to Schenectady Chemicals, Incorporated, New York, N.Y.
No Drawing. Filed Apr. 26, 1971, Ser. No. 137,577
Int. Cl. C08d 9/10; C08g 37/18
U.S. Cl. 260—25
19 Claims

ABSTRACT OF THE DISCLOSURE

Dimethylol alkyl phenols and low polymers thereof having an average of 60 to 85% of the available methylol groups replaced by halomethyl are prepared. They are useful in vulcanizing various elastomers at room (ambient) temperatures. Preferably the halogen is bromine. Also preferably a zinc compound, most preferably zinc oxide, is present to speed up the vulcanization. The vulcanization of liquid rubbers is particularly effective.

---

The present invention relates to novel halomethylated alkyl phenols and their use as curing or vulcanizing agents for elastomers, and especially for liquid elastomers.

The preparation of dimethylol alkyl phenols having a portion of the methylol groups replaced by halomethyl is disclosed in Braidwood Patent 2,972,600 and Fusco Patents 3,093,613 and 3,165,496. These halomethylated phenols are disclosed as being useful in the conventional hot vulcanization of solid butyl rubber. Braidwood has relatively low amounts of halogen, e.g. to 9% bromine, Fusco can have more halogen, e.g. 0.3 to 4 moles per mole of polymethylol phenol. However, Fusco points out that his polymethylol phenols can be polymeric and hence the molar amount of halogen per phenol unit is considerably less. Fusco refers to the halogen being 1 to 60 weight percent of the halogenated polymethylol hydrocarbon substituted phenol and that the amount of halogen varies with the particular halogen. Thus with iodine the heaviest halogen the weight percent of halogen is highest. Fusco points out that with chlorine or bromine the preferred weight percent is 2 to 16% and with iodine 5 to 30%. The preferred bromine content is 3 to 7% with a dimethylol p-octylphenol resin.

It has now been found that valuable products are obtained if dimethylol p-alkyl phenols and low polymers thereof (i.e. compounds generally having 1 to 6 phenolic nuclei and averaging 1 to 4 phenolic nuclei) are halogenated so as to replace an average of 60 to 85% of the available methylol groups with halomethyl groups. The preferred halogen is bromine. Less preferably iodine can be used as the halogen of the halomethyl group. Preferably about 65-75% of the available methylol groups are replaced by bromomethyl (or iodomethyl). The product obtained is a liquid mixture of monomer and oligomer. This mixture has 60-85% of the theoretical halogen assuming the entire mixture was monomer, however since the product has a considerable amount of oligomer in it, the halogen can be actually very close to the theoretical for the total available methylol groups, i.e. the hydroxyls of the available methylol groups have been substantially completely replaced by halogen. It is critical that the mixture be liquid for satisfactory mixing with liquid elastomers to get uniform dispersion and cure. Crystalline materials such as dihalomethyl alkyl phenols are not satisfactory.

The materials which are halogenated are 2,6-dihydroxymethyl 4-alkyl (or 4-aryl) phenols and resitols thereof having up to 6 phenolic nuclei, usually averaging not over 4 phenolic nuclei. The alkyl group can have 1 to 20 carbon atoms but preferably has at least 4 carbon atoms. Thus there can be used the dimethylol 4-alkyl phenols and corresponding resitols shown in the aforementioned Braidwood and Fusco patents, 2,6-dimethylol p-cresol, 2,6-dimethylol p-isopropyl phenol, 2,6-dimethylol 4-butylphenol, 2,6-dimethylol 4 - t-butylphenol, 2,6-dimethylol-4-octylphenol, 2,6 - dimethylol 4-tt-octyl phenol, 2,6-dimethylol 4-p-t-amylphenol, 2,6-dimethylol 4-p dodecyl phenol, 2,6-dimethylol 4-p-eicosyl phenol, 2,6-dimethylol 4-p-tetradecylphenol, 2,6-dimethylol 4-p-hexyl phenol, 2,6-dimethylol-4 - (3' - methyl)pentyl phenol (also called 2,6-dimethylol 4-p-t-hexylphenol), 2,6-dimethylol 4-p-nonyl phenol (the nonylphenol being formed by alkylation of mixed nonenes with phenol), 2,6-dimethylol 4-p-cyclohexyl phenol, 2,6-dimethylol 4 - p-phenyl phenol, 2,6-dimethylol 4-cumyl phenol. 2,6-dimethylol 4-hexadecyl phenol. The corresponding resitols having up to 6 phenol units are also included. In fact in most procedures for making the 2,6-dimethylol p-alkyl phenols they are prepared admixed with low molecular weight polymers, i.e. resitols, The halomethyl phenols of the present invention unexpectedly have been found to be useful as ambient, i.e. room temperature curing or vulcanizing agents for many elastomers, and especially for many liquid elastomers. The term room temperature curing agents means that the curing can be initiated without the application of external heat. The reaction is exothermic and during the curing the temperature may rise to 80° C. or even 100° C. The exotherm can be controlled with external cooling if desired.

The halomethylated compounds of the invention, e.g. the brominated dimethylol p-octylphenol having about 65–75% of the methylol groups replaced by bromomethyl and having 27-32% (usually 28–31%) of bromine in the molecule and having an average molecular weight of 500 and identified hereinafter as CRJ-328, cross link liquid elastomers such as liquid hydroxy terminated butadiene-styrene copolymer, liquid hydroxy terminated butadiene-acrylonitrile copolymer, liquid hydroxy terminated polybutadiene, liquid sodium polymerized polybutadiene, liquid lithium polymerized polybutadiene, liquid isobutylene-isoprene copolymer, liquid carboxy terminated butadiene (does not cure as well as some of the other polymers), liquid mercaptan terminated butadiene-acrylonitrile copolymer, liquid isoprene polymers, e.g. partially depolymerized rubber, all can be vulcanized at ambient temperatures.

Solid butyl rubber likewise can be cured at ambient temperature. The use of liquid elastomers is preferred because of the "scorchy" nature of the halomethyl phenolic resin curatives.

The vulcanizing reaction of the bromomethylated phenols of the present invention is catalyzed by the addition of zinc compounds such as zinc oxide, zinc resinate, zinc naphthenate, and zinc salicylate. Zinc oxide is preferred. The exact amount of zinc compound is not critical but will vary to some extent with the elastomer to be vulcanized. Thus as little as 1% of zinc oxide based on the elastomer is effective. Likewise the amount of bromomethylated phenol curing agent is not critical and will vary with the particular elastomer, rate of cure desired, etc.

The bromomethylated compounds and the iodomethylated compounds of the present invention provide the first phenolic system to enable ambient temperature vulcanization of elastomers of both the functional containing variety and elastomers containing unsaturation as the sole reactive sites. The vulcanization is believed to proceed through the unsaturated or at the allylic hydrogen. In the elastomers which contain active hydrogen such as hydroxy terminated butadiene possibly the reaction also takes place at the hydroxyl group, e.g. by splitting off HBr.

To obtain stability in the formation of the bromomethylated products it is frequently desirable to add a chelating agent, particularly iron chelating agents such as Versene Iron specific (mono sodium salt of N,N'-dihydroxyethyl glycine).

The amount of bromine in the bromomethylated phenols of the invention is preferably in the range of the highest amount that the particular methylolated alkyl phenol can react with and be stable to storage, i.e. the product should not be a corrosive mixture which spontaneously self-eliminates HBr. CRJ-328 illustrates a preferred form of bromomethylated product which is stable to storage and which is activated by being mixed with zinc compounds.

As stated in the vulcanization it is especially preferred to employ zinc oxide in the vulcanization due to its ability to scrub the HBr or HI byproduct of the vulcanization.

The presence of strongly alkaline materials should be avoided in the vulcanization since significant amounts of such alkaline materials, e.g. alkali metal hydroxides and alkaline earth hydroxides or alkaline amines "kill" the room temperature vulcanization. Anything which will compete with the elastomer for the bromomethyl groups or interfere with the desired vulcanization reaction of course should be avoided in the reaction.

As used in the following examples CRJ-328 was diluted with 5 to 7% of toluene to give a viscosity of approximately 15000 centipoise for handling purposes. The presence of toluene in the composition is not essential.

It should be realized that some elastomers will not vulcanize with the compounds of the invention, e.g. Hycar 1312 a liquid butadiene-acrylonitrile elastomer does not normally vulcanize.

The starting dimethylol p-alkyl (or aryl) phenols and resitols are prepared in conventional fashion by reacting approximately 2 moles of formaldehyde with 1 mole of a para alkyl phenol using alkaline catalysis, for example NaOH, KOH or MgO as shown for example in the Braidwood and Fusco patents. The dimethylol para alkyl (or aryl) phenols and resitols are then separated from the alkaline catalyst by neutralization and washing. The methylolated alkyl phenolic product is then reacted with aqueous hydrobromic acid to form the bromomethyl groups with some residual hydroxymethyl groups still remaining to give a product having the formula

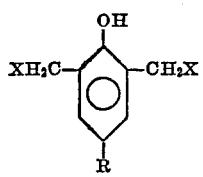

where X is Br, OH, I,

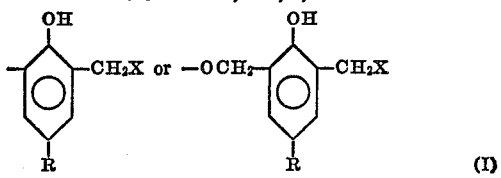

(I)

where R is alkyl or aryl (e.g. phenyl or alkylphenyl) and the average number of phenolic nuclei (units) is 1 to 6 per molecule. CRJ-328 fits Formula I when R is p-t-octyl, the molecular weight is about 500 and the product has about 28–31% of Br. 60 to 85% of the terminal X units are halogen of atomic weight 80 to 127. The terminal X units are those which are methylol or halomethyl. By terminal X units is meant those X units which will analyze as methylol or halomethyl, thus methylene ether bridges analyze as methylol.

Unless otherwise indicated all parts and percentages are by weight.

EXAMPLE 1

Highly brominated p-t-butylphenol product

|  | Grams |
|---|---|
| (A) 31–134 dimethylol p-t-butylphenol condensate | 420 |
| (B) Toluene | 300 |
| (C) Versene iron specific | 10.5 |
| (D) 48% aqueous HBr | 575 |

A, B and C were loaded into a reactor and heated to 50° C., a 20-inch vacuum was applied and D was added dropwise over 40 minutes. The product was azeotropically distilled to 90° C. and cooled to room temperature to give a viscous product containing 38.8% bromine (85% of the theoretical maximum) and 95.5% solids.

EXAMPLE 2

Preparation of 311–134 condensate

|  | Grams |
|---|---|
| (A) p-t-Butyl phenol (10 moles) | 1500 |
| (B) 37% aqueous formaldehyde (20.5 moles) | 1664 |
| (C) 50% aqueous NaOH | 400 |
| (D) 20% aqueous HCl | 830 |
| (E) H$_2$O | 1000 |
| (F) H$_2$O | 1000 |
| (G) H$_2$O | 1000 |
| (H) H$_2$O | 800 |

A and B were loaded into a 5-liter flask. C was added dropwise. The heat exotherm was to 42° C. The mixture was held there for 2 hours and then allowed to stand overnight. The product was neutralized to a pH of 4.0 with D and washed 4 times consecutively with E, F, G and H, decanting off the water layer. There was obtained 311–134 condensate in a yield of 2165 grams, molecular weight 227 (theory 210), percent CH$_2$OH of 15.71 (theory 16.2).

EXAMPLE 3

Preparation of CRJ-328 (highly brominated p-t-octyl phenol reactive condensate)

|  | Grams |
|---|---|
| (A) Dimethylol p-t-octylphenol condensate containing toluene (258–88) | 2480 |
| (B) 48% aqueous HBr | 1690 |

A was loaded into a 5 liter flask and heated to 50° C. Dropwise there was added B over 155 minutes. The mixture was held at 50° C. for 1 hour. The mixture was then distilled with a 26 inch vacuum to 100° C. and the temperature held for 30 minutes, and the product cooled.

Yield of CRP-328 was 1638 grams, Br 28.65%, molecular weight 502, viscosity about 15,000 centipoises.

EXAMPLE 4

Preparation of 258–88 condensate

|  | Grams |
|---|---|
| (A) p-t-Octyl phenol | 3605 |
| (B) 37% aqueous formaldehyde | 3129 |
| (C) Water | 2380 |
| (D) 50% aqueous NaOH | 1120 |
| (E) 37% aqueous HCl | 1400 |
| (F) H$_2$O | 1400 |
| (G) H$_2$O | 1750 |
| (H) H$_2$O | 1750 |
| (I) H$_2$O | 1750 |
| (J) Toluene | 1750 |

A, B and C at 25° C. were loaded into a flask. D was added at 25–30° C. over 15 minutes. The mixture was held for 48 hours at 25–30° C. and then neutralized with E. The water layer was separated. The residue was washed at 25–30° C. with F, G, H and I, decanting the water layer each time. Then J was added to dilute the product.

Yield: 7638 grams (58% solids).

EXAMPLE 5

Highly brominated dodecyl phenol reactive condensate

| | Grams |
|---|---|
| (A) Dimethylol p-dodecylphenol condensate (311–157) | 644 |
| (B) Toluene | 200 |
| (C) 48% aqueous HBr | 575 |
| (D) Versene Iron specific | 16.1 |

A, B and D were loaded into a flask. The mixture was heated to 50° C. and 20 inches of vacuum applied. C was added dropwise over one hour. The mixture was azeotropically distilled with 21 inches of vacuum to 110° C., held for 10 minutes and cooled to room temperature.

| | Percent |
|---|---|
| Solids | 98.6 |
| Br | 30.0 |
| Molecular weight | 477 |
| Methylol | 8.34 |

Gardner-Holdt viscosity: $Z_5$.

EXAMPLE 6

Preparation of 311–157 condensate

| | Grams |
|---|---|
| (A) p-Dodecyl phenol (7.5 moles) grams | 1965 |
| (B) 37% aqueous formaldehyde (15.4 moles) grams | 1250 |
| (C) 50% aqueous NaOH do | 300 |
| (D) 20% aqueous HCl ml | 620 |
| (E) $H_2O$ grams | 1000 |
| (F) $H_2O$ do | 1000 |
| (G) $H_2O$ do | 1000 |

A and B were loaded into a reactor and heated to 40° C. Then C was added dropwise over 0.5 hour. The mixture was held under 50° C. for two hours and then neutralized with D to pH of 1. The mixture was then washed three times consecutively with E, F and G, decanting off the water layer each time. The product had 71% solids, 9.27% water, 24.95% $CH_2OH$ and the yield of 311–157 was 3385 grams.

EXAMPLE 7

Highly iodinated reactive condensate

| | Grams |
|---|---|
| (A) Dimethylol p-t-octylphenol condensate (258–88) | 863 |
| (B) $FeCl_3 \cdot 6H_2O$ | 0.05 |
| (C) 47% aqueous hydroiodic acid | 600 |

A and B were loaded into a flask and heated to 50° C. Then C was added dropwise over 7 minutes. The flask was set for distillation and distilled to 100° C. at about 21 inches of vacuum. The mixture was held there for 15 minutes and cooled.

The product had 37.3% I and the yield was 664 grams.

EXAMPLE 8

This example illustrates the formation of a heat reactive halomethylated condensate which has too little halogen to effect a room temperature vulcanization. Hence it is not within the invention.

| | Grams |
|---|---|
| (A) Dimethylol p-t-octylphenol condensate (258–88) at 100% solids | 200 |
| (B) Versene Iron specific | 5 |
| (C) 48% aqueous HBr | 104 |

A and B were loaded into a 2 liter flask set up for azeotropic distillation. The mixture was distilled at 26 inches of vacuum to 45–50° C. Then C was added over 5 minutes and the mixture distilled in vacuum to 90° C. and cooled.

| | Percent |
|---|---|
| Solids | 82 |
| Br | 20.0 |

Gardner-Holdt viscosity: $Z_3-Z_4$.

In the subsequent examples the materials used are identified as follows.

Arco CS–15 is a liquid hydroxyl terminated copolymer of butadiene and styrene (75:25) having a viscosity of 225 poises at 30° C., hydroxyl content 0.65 meq./g., equivalent weight of 1538, polybutadiene microstructure trans-1,4 60%, cis-1,4 20% and vinyl-1,2 20%.

Arco CN–15 is a liquid hydroxyl terminated copolymer of butadiene and acrylonitrile (85:15), viscosity of 525 poises at 30° C., hydroxyl content 0.60 meq./g. equivalent weight of 1667 and polybutadiene microstructure is the same as for Arco CS–15. The equivalent weight of the Arco products is $$\frac{1000}{\text{OH content}}$$

Arco R45HT is a liquid hydroxyl terminated butadiene homopolymer having a viscosity of 50 poises at 30° C., a hydroxyl content of 0.75 meq./g. and an equivalent weight of 1250. The polybutadiene microstructure is the same as for Arco CS–15.

Arco R15M is a hydroxyl terminated liquid butadiene homopolymer, viscosity 200 poises at 30° C., hydroxyl content 0.70 meq./g., equivalent weight 1428 and polybutadiene microstructure as for Arco CS–15.

Ricon 150 is a sodium polymerized viscous liquid polybutadiene containing 70% pendent 1,2-vinyl groups, molecular weight approximately 2000 (Ricon 100 which can also be used is a viscous liquid sodium polymerized butadiene-styrene copolymer (80:20) molecular weight 2000 and having 70% pendent 1,2-vinyl groups).

LM Butyl MD 504 is a viscous liquid isobutylene-isoprene copolymer (about 96:4), molecular weight 30,000 to 35,000. LM chlorobutyl is a viscous liquid chlorinated butyl rubber molecular weight 30,000 to 35,000.

Lithene AH is a liquid lithium polymerized phenyl terminated polybutadiene, molecular weight 1500–2000, viscosity about 2000 poise at 25° C. and has 15% trans 1,4 and 60% vinyl unsaturation and 25% internally cyclized groups.

Lithene PH is a liquid lithium polymerized phenyl terminated polybutadiene, molecular weight 2000–3000 viscosity about 66 poises at 25° C. and has 10% cis-1,4, 45% trans-1,4 and 45% vinyl unsaturation.

Lithene QH is a liquid lithium polymerized phenyl terminated polybutadiene, molecular weight about 3000, viscosity about 90 poises at 25° C. and containing 35% cis-1,4, 30% trans-1,4 and 35% vinyl unsaturation.

Hystl C–1000 is a liquid carboxy terminated polybutadiene, molecular weight 1350±150, viscosity 50–200 poises at 45° C., carboxyl content 1.11 meq./gram.

Hystl G–1000 is a liquid hydroxyl terminated polybutadiene, molecular weight 1350±150, viscosity 25–100 poise at 45° C., hydroxyl content 1.18 meq./gram.

Hystl G–2000 is similar to Hystl GF–1000 but has a molecular weight of 2000±200, a viscosity of 100–350 poise at 45° C. and a hydroxyl content of 0.75 meq./gram.

Hystl B–2000 is a liquid polybutadiene molecular weight 2000±200, having a viscosity of 30–140 poise at 45° C. and a vinyl content of at least 90%.

The new elastomer cure systems containing the highly halomethylated phenolics are useful in caulks, sealants, adhesives, propellant binders, potting compositions, encapsulation compounds, in masking tape, e.g. to make natural rubber have more holding resistance at elevative temperature by partially vulcanizing the rubber, and in coatings, e.g. to coat a polyurethane foam to protect the foam. This latter use is particularly effective when there is employed a hydroxyl terminated liquid rubber.

As previously stated zinc oxide is preferably present in the composition because its use aids in controlling the pot life of the composition as well as the ultimate state of cure.

Table I describes the use of various types of zinc oxide as catalysts for the room temperature vulcanization of Arco R15M. As one can see, the pot life can be controlled somewhat by using the appropriate zinc oxide. The higher surface area zinc oxides have shorter pot lives.

There were utilized 13 phr. of zinc oxide and 30 phr. of CRJ-328 in the work recorded in Table I.

The term "phr." indicates the part "per hundred parts of rubber."

Tables II through VII illustrate the effect of various levels of ZnO and CRJ-328 on the vulcanization of six liquid elastomers.

It is quite obvious from the tables that zinc oxide has a marked effect on pot life, with increased amounts decreasing pot life significantly. It is also obvious that increased amounts of CRJ-328 cured the elastomers to a higher Shore A hardness.

It has been found that, when utilizing 40 phr. of CRJ-328, the lower levels of zinc oxide can initiate an exothermic reaction which is difficult to control resulting in the decomposition of the vulcanizate. This decomposition is evidenced by a violent emanation of HBr, frothing of the mass and a resultant black, friable product. Higher levels of zinc oxide prevent these phenomena.

In general, it has been found that CRJ-328 at the 30-part level and zinc oxide at the 13-part level gives the best balance of properties and handling safety for most liquid elastomers. Table VIII presents the strength properties of a variety of gum liquid elastomers vulcanized with 30 phr. of CRJ-328 and 13 phr. of zinc oxide. Tables IX and X illustrate the effect of black and white loadings.

ADHESIVE PROPERTIES

The tensile shear strength of various substrates bonded with CRJ-328 vulcanized elastomers was also evaluated.

After 24 hours aging, attempts to remove the coating from the foam resulted in foam tear, showing the strong adhesion of the cured rubber to the polyurethane foam.

EFFECT OF IMMERSION FOR ONE WEEK AT 25° C. ON CRJ-328 VULCANIZED ELASTOMERS

Various elastomers vulcanized with 30 phr. of CRJ-328 and 13 phr. of zinc oxide were cast into ½ inch cubes. The cubes were aged for one week at room temperature then immersed in the media shown in Table XIII for one week and the weight again measured. The figures shown are percent weight change.

CURING OF SOLID ELASTOMERS WITH CRJ-328

Formulation:                                       Parts
  Butyl 035 _____ 100
  HAF black _____ 50
  Zinc oxide _____ 5
  Stearic acid _____ 1

The above formulation was prepared in a Banbury mixer and then transferred to a two-roll mill where the amounts of CRJ-328 indicated in Table XIV were added. The stock was then sheeted and pressed for ten minutes at room temperature.

Slabs were aged for 24 and 96 hours at 25° C., then physical properties measured. Results are summarized in Table XIV.

The advantages of the cure system of the invention include a low temperature vulcanization and formation of light colored stocks. The scorchy nature of this cure system is of special value in applications requiring faster cure times at lower temperatures.

TABLE I
Effect of various types of ZnO with CRJ-328 in Arco R15M

| ZnO type [1] | Pot life (min.) | Color | 24-hr. Shore A hardness | Surface area (m.²/g.) | Modification of ZnO |
|---|---|---|---|---|---|
| Kadox 15 | 7 | Tan | 50 | 10 | None. |
| Kadox 72 | 11 | Tan | 52 | 6 | Do. |
| Protox 168 | 10 | Tan | 53 | 6 | Kadox-72 with $CH_3CH_2COOH$. |
| Protox 169 | 7 | Tan | 53 | 10 | Kadox-15 with $CH_3CH_2COOH$. |
| Actox 14 | 16 | Brown | 55 | 3.5 | None. |
| Actox 16 | 12 | Tan | 52 | 3.5 | $CH_3CH_2COOH$ treated powder. |
| Actox 216 | 28 | Brown | 52 | 3.5 | $CH_3CH_2COOH$ treated pellet. |
| XX78 | 19 | Light brown | 60 | 3.5 | None. |
| XX203 | 35 | do | 58 | 4 | Do. |
| Type 601 | 9 | do | 60 | 2.7 | Do. |

[1] All are products of the New Jersey Zinc Company.

The bonded substrates were aged for 72 hours at room temperature before testing at two inches per minute separation on a Tinius Olsen. The results are shown in Table XI.

Fabric peel strength of various substrates utilizing 30 phr. CRJ-328 and 13 phr. of zinc oxide in Lithene AH were evaluated and the results are shown in Table XII. The bonded substrates were rolled with a three-pound roller then aged for 48 hours at room temperature before pulling at two inches per minute (T-peel).

The following formulation was evaluated as a polyurethane foam coating:

Lithene AH _____ 100
Zinc oxide _____ 13
CRJ-328 _____ 30

TABLE II
[Arco CN-15]

| Phr. ZnO (Kadox 15) | Phr. CRJ-328 | Pot life (min.) | Shore A hardness | | | |
|---|---|---|---|---|---|---|
| | | | 24-hr. at RT [1] | 48-hr. at 158° F. | 96-hr. at 212° F. | 7 days water immersion |
| 6.5 | 20 | 110 | 17 | 35 | 60 | 29 |
| 13 | 20 | 42 | 20 | 41 | 64 | 21 |
| 20 | 20 | 22 | 21 | 36 | 60 | 23 |
| 6.5 | 30 | 54 | 51 | 53 | 76 | 43 |
| 13 | 30 | 50 | 42 | 52 | 70 | 41 |
| 20 | 30 | 15 | 47 | 55 | 75 | 35 |
| 6.5 | 40 | 57 | 71 | 89 | 86 | 60 |
| 13 | 40 | 33 | 54 | 60 | 90 | 49 |
| 20 | 40 | 14 | 56 | 71 | 91 | 42 |

[1] RT is room temperature.

TABLE III
[Arco R45HT]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 20 | 17 | 18 | 40 | 80 | 15 |
| 13 | 20 | 12 | 28 | 37 | 65 | 25 |
| 20 | 20 | 6 | 15 | 32 | 54 | 14 |
| 6.5 | 30 | 10 | 52 | 62 | 80 | 49 |
| 13 | 30 | 6 | 44 | 71 | 93 | 43 |
| 20 | 30 | 5 | 37 | 41 | 70 | 31 |
| 6.5 | 40 | 20 | 41 | 73 | 86 | 46 |
| 13 | 40 | 6 | 58 | 80 | 75 | 61 |
| 20 | 40 | 5 | 48 | 62 | 71 | 50 |

TABLE IV
[Ricon 150]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 20 | 40 | 20 | 48 | 90 | 22 |
| 13 | 20 | 26 | 16 | 21 | 30 | 15 |
| 20 | 20 | 15 | 20 | 25 | 60 | 18 |
| 6.5 | 30 | 24 | 30 | 77 | 80 | 49 |
| 13 | 30 | 12 | 32 | 38 | 51 | 35 |
| 20 | 30 | 10 | 35 | 38 | 50 | 32 |
| 6.5 | 40 | ¹13 | | | | |
| 13 | 40 | ¹7 | | | | |
| 20 | 40 | 6 | 44 | 59 | 76 | 50 |

¹ These samples exothermed and frothed to friable black masses in 17 minutes.

TABLE V
[Lithene AH]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 20 | 84 | 15 | 25 | 45 | 50 |
| 13 | 20 | 83 | 18 | 20 | 25 | 27 |
| 20 | 20 | 65 | 25 | 33 | 52 | 32 |
| 6.5 | 30 | 42 | 53 | 73 | 66 | 80 |
| 13 | 30 | 29 | 54 | 55 | 82 | 63 |
| 20 | 30 | 24 | 50 | 60 | 84 | 70 |
| 6.5 | 40 | 26 | 65 | 95 | 85 | 77 |
| 13 | 40 | 9 | 74 | 85 | 80 | 78 |
| 20 | 40 | 7 | 72 | 78 | 82 | 85 |

TABLE VI
[LM Butyl MD504]

| Phr. ZnO (Kadox 15) | Phr. CRJ-328 | Pot life (min) | Shore A hardness | | | |
|---|---|---|---|---|---|---|
| | | | 24-hr. at RT | 48-hr. at 158° F | 96-hr. at 212° F | 7 days water immersion |
| 6.5 | 20 | | 22 | 27 | 30 | 24 |
| 13 | 20 | | 22 | 27 | 20 | 20 |
| 20 | 20 | | 25 | 30 | 39 | 26 |
| 6.5 | 30 | | 32 | 40 | 40 | 35 |
| 13 | 30 | | 34 | 47 | 46 | 40 |
| 20 | 30 | | 32 | 39 | 40 | 36 |
| 6.5 | 40 | | 27 | 36 | 37 | 31 |
| 13 | 40 | | 32 | 38 | 37 | 33 |
| 20 | 40 | | 31 | 35 | 37 | 32 |

NOTE.—Due to the fact that this elastomer is very viscous, the above formulations were prepared on a two-roll mill and the pot life could not be measured accurately. The pot life for the above formulations was approximately ten minutes.

TABLE VII
[Arco CS-15]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 20 | 18 | 38 | 67 | 85 | 35 |
| 13 | 20 | 11 | 24 | 42 | 85 | 20 |
| 20 | 20 | 8 | 24 | 45 | 75 | 27 |
| 6.5 | 30 | 13 | 55 | 87 | 82 | 23 |
| 13 | 30 | 7 | 51 | 50 | 70 | 45 |
| 20 | 30 | 10 | 46 | 51 | 80 | 37 |
| 6.5 | 40 | ¹10 | | | | |
| 13 | 40 | 7 | 66 | 74 | 87 | 66 |
| 20 | 40 | 5 | 63 | 70 | 75 | 62 |

¹ This formulation exothermed and frothed to a friable black mass which was unusable.

TABLE VIII
[Tensile strength and elongation of gum elastomers vulcanized at 25° C. with 30 parts CRJ-328 and 13 parts kadox 15 (zinc oxide)]

| Elastomer | Length of time at RT, days | Shore A | Tensile (p.s.i.) | Elongation, percent |
|---|---|---|---|---|
| LM Butyl MD504 plus 10% Flexon 845 ¹ | 2 | 52 | 163 | 70 |
| Arco CS-15 | 15 | 65 | 172 | 0 |
| Arco CN-15 | 14 | 47 | 195 | 100 |
| Ricon 150 | 13 | 45 | 109 | 55 |
| Lithene AH | 12 | 57 | 316 | 100 |
| Arco R15M | 2 | 58 | 170 | 40 |
| Arco R45HT | 2 | 42 | 106 | 50 |

¹ Flexon 845 is a parafinic hydrocarbon oil of viscosity 150 SSU at 100° F. (Humble Oil Refining Company.)

NOTE.—The above formulations were pressed in an ASTM mold conforming to Test Method D-15 at 75 to 100 p.s.i. for one hour between Teflon sheets for easy removal.

TABLE IX
[Tensile strength and elongation of elastomers loaded with 60 parts FEF black vulcanized at 25° C. with 30 parts CRJ-328 and 13 parts zinc oxide]

| Elastomer | Tensile strength (p.s.i.) | | Percent elongation | |
|---|---|---|---|---|
| | 1 Wk¹ at RT | 158° F. for 70 hrs. | 1 Wk¹ at RT | 158° F. for 70 hrs. |
| Lithene AH | 680 | 286 | 25 | 10 |
| Arco R15M | 400 | 423 | 30 | 15 |
| Arco CS-15 | 496 | 595 | 35 | 20 |
| Ricon 150 | 449 | 468 | 30 | 15 |
| LM Butyl MD504 | 232 | 476 | 145 | 50 |
| LM chlorobutyl | 371 | 297 | 140 | 85 |

¹ Wk=Week.

TABLE X
[Tensile strength and elongation of elastomers loaded with 60 parts titanium dioxide vulcanized at 25° C. with 30 parts CRJ-328 and 13 parts zinc oxide]

| Elastomer | Tensile strength (p.s.i.) | | Percent elongation | |
|---|---|---|---|---|
| | 1 Wk at RT | 158° F. for 70 hrs. | 1 Wk at RT | 158° F. for 70 hrs. |
| Lithene AH | 406 | 785 | 75 | 55 |
| Arco R15M | 415 | 295 | 50 | 30 |
| Arco CS-15 | 250 | 315 | 70 | 60 |
| Ricon 150 | 150 | 870 | 50 | 40 |
| LM Butyl MD504 | 144 | 188 | 125 | 40 |

TABLE XI
[Use of CRJ-328 vulcanized elastomers as adhesives]

| Elastomer type | Phr. ZnO | Phr. CRJ-328 | Tensile shear (p.s.i.) | | | | |
|---|---|---|---|---|---|---|---|
| | | | Steel/steel | Glass cloth/glass cloth | Mylar/Mylar | Canvas/canvas | Plywood/plywood |
| Arco CS-15 | 20 | 20 | | 38 C | 50 A | 70 C | |
| Arco CN-15 | 6.5 | 30 | | 91 C | 24 A | 45 C | |
| Ricon 150 | 20 | 30 | | 34 C | 42 A | 24 C | |
| Lithene AH | 6.5 | 40 | 500 C | ¹149 C | 191 A | ¹165 C | 281 A |
| Arco R15M | 6.5 | 30 | 53 A | 78 C | 24 A | 92 C | 174 A |
| Arco R45HT | 13 | 30 | 82 A | 78 C | 40 A | 20 C | 196 A |

¹ Indicates substrate failure.

NOTE.—C=Indicates cohesive failure. A=Indicates adhesive failure.
Substrates.—Canvas=20-oz. electrical laminating grade cotton duck; Glass Cloth=Type 181, Finish A1100 Hard; Mylar=15 mils. (Mylar is biaxially oriented polyethylene terephthalate); Plywood=3 ply interior grade; Steel=16 gauge, cold rolled.

TABLE XII.—FABRIC TO FABRIC PEEL STRENGTH [1]

| Mylar/Mylar | Glass cloth/ glass cloth | Canvas/canvas |
|---|---|---|
| 4.4 lbs.[2] A | lbs. C | 7 lbs. C |

[1] ASTM D-1876, 2″/min., test temperature 73° F.
[2] Values are in pounds per linear inch.

NOTE.—A=Adhesive failure, C=Cohesive failure.
Substrates.—Mylar=15 mil; Glass Cloth=Type 181, Finish A-1100 Hard; Canvas=20-oz. electrical laminating grade cotton duck.

TABLE XIII.—EFFECT OF IMMERSION OF CRJ-328 CURED ELASTOMERS

| | Percent weight gain | | | | | |
|---|---|---|---|---|---|---|
| Media | Arco CS-15 | Arco CN-15 | Ricon 150 | Lithene AH | Arco R45HT | 10% Flexon 845 Mod LM Butyl |
| 10% HCl | 3.6 | 3.3 | 6.7 | 2.5 | 5.9 | 2.5 |
| 10% NaOH | 3.3 | 4.4 | 4.3 | 6.0 | 5.9 | 3.0 |
| Toluene | [1]High | 151 | [1]High | [1]High | [1]High | 151 |
| Hexane | 110 | 32 | [1]High | [1]High | [1]High | 112 |
| Acetone | 61 | 19 | 17 | 25 | 18 | 23 |
| Methanol | 23 | | 10 | 6 | 16 | 3 |

[1] The cubes deteriorated badly so that measurement was difficult. The cubes were fragmented upon one week submersion.

TABLE XIV.—PHYSICAL PROPERTIES OF BUTYL 035 VULCANIZED WITH CRJ-328

| | Aged 24 hours | | | | | Aged 96 hours | | | | |
|---|---|---|---|---|---|---|---|---|---|---|
| Amount CRJ-328 | Tensile (p.s.i.) | $M_{100}$ [a] | $M_{300}$ [a] | Percent elongation | Shore A hardness | Tensile (p.s.i.) | $M_{100}$ [a] | $M_{300}$ [a] | Percent elongation | Shore A hardness |
| 6.0 pts | 20 | 39 | 39 | 1,000 | 43 | 150 | 57 | 96 | 965 | 45 |
| 9.0 pts | 70 | 70 | 87 | 1,000 | 44 | 412 | 107 | 196 | 650 | 45 |
| 12.0 pts | 535 | 83 | 164 | 935 | 45 | 1,300 | 174 | 695 | 520 | 52 |
| 20.0 pts | 1,240 | 113 | 585 | 445 | 49 | 1,440 | 285 | 1,440 | 300 | 52 |

[a] Modulus.

The use of highly iodomethylated p-alkylphenol products, e.g. the product of Example 7 in place of the CRJ-328 also gives cured elastomers. The action of the iodomethylated compounds, however, is much more rapid and difficult to control. The highly bromomethylated products of Examples 1 and 5 likewise can be used in place of CRJ-328 as curing agents.

The following tables show the curing of additional liquid elastomers with CRJ-328. Only more limited curing conditions can be employed to cure these elastomers than those employed in the previous tables.

TABLE XV
[Hystl C-1000]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 20 | NC | NC | NC | NC | NC |
| 13 | 20 | 11 | 22 | 68 | 80 | 45 |
| 20 | 20 | NC | NC | NC | NC | NC |
| 6.5 | 30 | 64 | 30 | 92 | 90 | 75 |
| 13 | 30 | 64 | 27 | 85 | 90 | 25 |
| 20 | 30 | 33 | 35 | NC | NC | NC |
| 6.5 | 40 | 33 | 35 | 84 | 90 | 60 |
| 13 | 40 | | 37 | 100+ | 100+ | 50 |
| 20 | 40 | | 27 | 80 | 83 | 65 |

NOTE.—NC=no cure.

TABLE XVI
[Hystl G-1000]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 20 | NC | NC | NC | NC | NC |
| 13 | 20 | NC | NC | NC | NC | NC |
| 20 | 20 | NC | NC | NC | NC | NC |
| 6.5 | 30 | 21 | 30 | | | |
| 13 | 30 | 9 | 36 | 50 | 70 | 60 |
| 20 | 30 | | NC | NC | NC | NC |
| 6.5 | 40 | 15 | 100+ | 100+ | 100+ | 100+ |
| 13 | 40 | 5 | 66 | 75 | 80 | 60 |
| 20 | 40 | 4 | 30 | 55 | 85 | 26 |

TABLE XVII
[Hystl B-2000]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 20 | 49 | NC | NC | NC | NC |
| 13 | 20 | 68 | NC | NC | NC | NC |
| 20 | 20 | NC | NC | NC | NC | NC |
| 6.5 | 30 | 24 | 20 | 72 | 92 | 42 |
| 13 | 30 | 19 | 24 | 42 | 45 | 48 |
| 20 | 30 | 18 | 33 | 40 | 50 | 28 |
| 6.5 | 40 | 14 | 60 | 80 | 86 | 70 |
| 13 | 40 | 12 | 60 | 86 | 87 | 60 |
| 20 | 40 | 10 | 30 | 35 | 40 | 39 |

TABLE XVIII
[Lithene PH]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 20 | 60 | 12 | 18 | 25 | 14 |
| 13 | 20 | 72 | 22 | 25 | 40 | 23 |
| 20 | 20 | 57 | 26 | 35 | 45 | 55 |
| 6.5 | 30 | 66 | 35 | 57 | 90 | 39 |
| 13 | 30 | 42 | 43 | 50 | 89 | 36 |
| 20 | 30 | 30 | 30 | 42 | 52 | 35 |
| 6.5 | 40 | 61 | 42 | 51 | 95 | 43 |
| 13 | 40 | 26 | 46 | 62 | 90 | 46 |
| 20 | 40 | 20 | 47 | 61 | 90 | 40 |

TABLE XIX
[Lithene AL]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 20 | NC | NC | NC | NC | NC |
| 13 | 20 | NC | NC | NC | NC | NC |
| 20 | 20 | NC | NC | NC | NC | NC |
| 6.5 | 30 | NC | NC | NC | NC | NC |
| 13 | 30 | NC | NC | NC | NC | NC |
| 20 | 30 | 81 | NC | NC | NC | NC |
| 6.5 | 40 | 45 | 9 | 70 | 76 | 55 |
| 13 | 40 | 39 | 13 | 87 | 70 | 70 |
| 20 | 40 | 15 | 18 | 80 | 90 | 35 |

NOTE.—NC=No cure.

TABLE XX
[Arco R15M]

| Phr. ZnO (Kadox 15) | Phr. CRJ-328 | Pot life (min.) | Shore A hardness | | | |
|---|---|---|---|---|---|---|
| | | | 24-hr. at RT | 48-hr. at 158° F. | 96-hr. at 212° F. | 7 days water immersion |
| 6.5 | 30 | 50 | 60 | 60 | 74 | 50 |
| 13 | 30 | 50 | 70 | 70 | 77 | 50 |
| 20 | 30 | 52 | 60 | 60 | 60 | 52 |

Unless otherwise indicated all parts and percentages are by weight. Based on the total of (1) zinc compound, e.g. zinc oxide, and (2) the halomethylated curing agent the zinc compound is usually between 14 and 50% the total of (1) and (2).

What is claimed is:

1. A composition comprising (1) a vulcanizable liquid elastomer which is a polymer of a diolefin, (2) a mixture of alkylated phenol compounds having the formula:

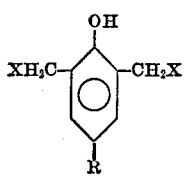

where X is OH, halogen of atomic weight 80 to 127,

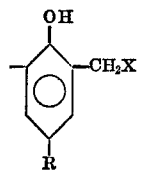

or

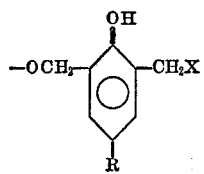

where R is alkyl or aryl and the average number of phenolic nuclei is 1 to 6 and 60 to 85% of the terminal X groups are said halogen, said mixture of alkylated phenol compounds being present in an amount sufficient to vulcanize said elastomer; a zinc compound selected from the group consisting of zinc oxide, zinc resinate, zinc naphthenate and zinc salicylate in an amount sufficient to control the working life of the composition.

2. A composition according to claim 1 wherein the mixture of alkylated phenols also is a liquid.

3. A composition according to claim 1 wherein said halogen is bromine.

4. A composition according to claim 1 wherein the zinc compound is zinc oxide and the halogen is bromine.

5. A composition according to claim 4 wherein the elastomer is a liquid elastomer selected from the group consisting of liquid butadiene polymers and liquid isoprene polymers.

6. A composition according to claim 1 wherein said mixture of compounds is present in an amount sufficient to initiate vulcanization at room temperature.

7. A composition according to claim 6 including zinc oxide in an amount sufficient to control the working life of the composition.

8. A composition according to claim 7 wherein the liquid elastomer is selected from the group consisting of hydroxy terminated polybutadiene, hydroxy terminated butadiene-styrene copolymer, hydroxy terminated butadiene-acrylonitrile copolymer, polyisoprene, polybutadiene and liquid butyl rubber copolymer.

9. A composition according to claim 8 wherein 65 to 75% of the terminal X groups are bromine.

10. A composition according to claim 8 wherein R is 8 carbon atom alkyl and the bromine is 27 to 32% of the weight of the mixture of compounds of said formula.

11. A process comprising initiating the vulcanization of the composition of claim 1 at room temperature.

12. A process according to claim 11 comprising including zinc oxide in the composition and completing the vulcanization using the exothermic heat of reaction as the sole source of heat.

13. A process according to claim 11 where the halogen is bromine.

14. A process according to claim 13 wherein the composition includes zinc oxide in an amount sufficient to control the working life of the composition.

15. A process according to claim 14 wherein the liquid polymer is liquid polyisoprene or liquid polybutadiene.

16. A process according to claim 14 wherein the liquid polymer is liquid hydroxy terminated polybutadiene, liquid hydroxy terminated butadiene-styrene copolymer, liquid hydroxy terminated butadiene-acrylonitrile.

17. A process according to claim 14 wherein the liquid polymer is liquid isobutylene-isoprene copolymer.

18. A process according to claim 14 wherein R is 8 carbon atom alkyl and the bromine is 27 to 32% of the weight of the mixture of compounds of said formula.

19. A process according to claim 18 wherein the liquid polymer is selected from the group consisting of liquid polybutadiene, liquid polyisoprene, liquid butyl rubber, liquid hydroxy terminated polybutadiene, liquid hydroxy terminated butadiene-styrene copolymer and liquid hydroxy terminated butadiene-acrylonitrile copolymer.

References Cited

UNITED STATES PATENTS

| | | | |
|---|---|---|---|
| 3,489,697 | 1/1970 | Brice | 260—846 |
| 3,093,613 | 6/1963 | Fusco et al. | 260—846 |
| 3,039,978 | 6/1962 | Fusco et al. | 260—846 |
| 3,083,174 | 3/1963 | Fefer et al. | 260—846 |
| 3,102,104 | 8/1963 | Brice | 260—846 |
| 3,358,051 | 12/1967 | Timmons et al. | 260—846 |
| 3,165,496 | 1/1965 | Fusco et al. | 260—846 |
| 3,096,301 | 7/1963 | Jankowski et al. | 260—846 |
| 3,028,353 | 4/1962 | Elmer et al. | 260—846 |

JOHN C. BLEUTGE, Primary Examiner

U.S. Cl. X.R.

260—38, 59, 619 R, 621 K, 623 D, 838, 845, 846, 848